United States Patent
Gomes et al.

(10) Patent No.: US 11,068,565 B2
(45) Date of Patent: Jul. 20, 2021

(54) SYSTEM OBTAINS SOFTWARE FEATURES INFORMATION OF ANOTHER SYSTEM

(71) Applicant: INTERNATIONAL BUSINESS MACHINES CORPORATION, Armonk, NY (US)

(72) Inventors: Louis P. Gomes, Poughkeepsie, NY (US); Patricia G. Driever, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

(21) Appl. No.: 16/440,282

(22) Filed: Jun. 13, 2019

(65) Prior Publication Data

US 2020/0394283 A1 Dec. 17, 2020

(51) Int. Cl.
*G06F 21/00* (2013.01)
*G06F 21/10* (2013.01)
*G06F 21/16* (2013.01)

(52) U.S. Cl.
CPC ............ *G06F 21/105* (2013.01); *G06F 21/16* (2013.01)

(58) Field of Classification Search
None
See application file for complete search history.

(56) References Cited

U.S. PATENT DOCUMENTS

| | | | | |
|---|---|---|---|---|
| 5,390,297 A * | 2/1995 | Barber | .................. | G06F 21/105 726/29 |
| 7,266,815 B2 | 9/2007 | Butt et al. | | |
| 7,472,286 B2 * | 12/2008 | Burkhardt | ............. | G06F 21/123 705/59 |
| 7,681,245 B2 * | 3/2010 | Walker | .................... | G06F 21/10 726/30 |
| 8,521,652 B2 | 8/2013 | Foster | | |
| 8,782,385 B2 | 7/2014 | Dennis et al. | | |
| 8,800,061 B2 * | 8/2014 | Glave | ..................... | G06F 21/88 726/34 |
| 8,850,605 B2 * | 9/2014 | Koka | .................... | G06F 21/105 726/29 |
| 8,850,607 B2 * | 9/2014 | Koka | .................... | G06F 21/105 726/31 |
| 9,147,049 B2 | 9/2015 | Donaldson | | |
| 9,569,600 B2 | 2/2017 | Ando | | |
| 9,740,836 B2 | 8/2017 | Sugiura et al. | | |

(Continued)

OTHER PUBLICATIONS

Alspaugh et al., "Analyzing Software Licenses In Open Architecture Software Systems," FLOSS'09 IEEE/ACM ICSE Workshop On, pp. 54-57, May 18, 2009.

(Continued)

*Primary Examiner* — Maung T Lwin (74) *Attorney, Agent, or Firm* — Steven Chiu, Esq.; Blanche E. Schiller Esq.; Heslin Rothenberg Farley & Mesiti P.C.

(57) ABSTRACT

A selected system obtains from a selected location software features information relating to another system. Using the software features information obtained from the selected location, a determination is made as to whether a selected license tier has been obtained. Based on determining that the selected license tier has been obtained, the selected system dispatches work of the other system into a container of the selected system.

20 Claims, 6 Drawing Sheets

(56) References Cited

U.S. PATENT DOCUMENTS

| | | |
|---|---|---|
| 10,013,536 B2 | 7/2018 | Dean et al. |
| 2002/0138764 A1* | 9/2002 | Jacobs ................... G06Q 30/06 726/28 |
| 2007/0255813 A1* | 11/2007 | Hoover ................. G06F 9/5061 709/223 |
| 2011/0010778 A1* | 1/2011 | Risan ............... G11B 20/00768 726/30 |
| 2011/0167259 A1 | 7/2011 | Fanton et al. |
| 2012/0042309 A1* | 2/2012 | Risan .................... H04L 63/102 717/175 |
| 2014/0325644 A1* | 10/2014 | Oberg ..................... G06F 21/51 726/22 |
| 2014/0380425 A1* | 12/2014 | Lockett ................... H04L 63/08 726/4 |
| 2015/0242599 A1 | 8/2015 | Chowdhury |
| 2015/0242600 A1 | 8/2015 | Ferris et al. |
| 2018/0007127 A1 | 1/2018 | Salapura et al. |
| 2018/0293363 A1 | 10/2018 | Asati et al. |

OTHER PUBLICATIONS

Bontis et al., "The Evolution of Software Pricing: A Framework for Box Licenses to Application Service Provider Models," Journal of Internet Research, pp. 1-15, Mar. 20, 2000.

IBM, "z/Architecture—Principles of Operation," IBM Publication No. SA22-7832-11, Twelfth Edition, Sep. 2017, pp. 1-1902.

Mell, Peter and Tim Grance, "The NIST Definition of Cloud Computing," National Institute of Standards and Technology, Information Technology Laboratory, Special Publication 800-145, Sep. 2011, pp. 1-7.

Morita et al., "LiMo Foundation: Toward A Common Linux-Based Mobile Platform," NTT DoCoMo Technical Journal, vol. 9, No. 2, pp. 51-55, Sep. 2007.

Nemoto et al., "Lin4Neuro: A Customized Linux Distribution Ready for Neuroimaging Analysis," BMC Medical Imaging, vol. 11, Issue 3, pp. 1-7, Jan. 25, 2011.

\* cited by examiner

SYSTEM OBTAINS SOFTWARE FEATURES INFORMATION OF ANOTHER SYSTEM

BACKGROUND

One or more aspects relate, in general, to processing within a computing environment, and in particular, to facilitating processing within the computing environment.

To facilitate one aspect of processing within a computing environment, docker containers are used. A docker container is an executable package of software that includes components to run an application. Some docker container solutions that include one example operating system wish to run workloads of a different operating system. In order for an operating system to run the workloads of a different operating system, a license is to be obtained.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes obtaining, by a selected system from a selected location, software features information relating to another system. Using the software features information obtained from the selected location, a determination is made as to whether a selected license tier has been obtained. Based on determining that the selected license tier has been obtained, work of the other system is dispatched, by the selected system, into a container of the selected system.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided for a selected system to obtain information about another system, including information relating to software features of the other system. The software features include, for instance, purchased and/or licensed software products of the other system. In one example, the selected system is one example of an operating system and the other system is another example of an operating system. For instance, the one operating system example is a non-Linux operating system, such as a z/OS® operating system offered by International Business Machines Corporation, Armonk, N.Y., or another operating system; and the other operating system example is a Linux® operating system, or another operating system different from the one example operating system. (IBM and z/OS are trademarks or registered trademarks of International Business Machines Corporation in at least one jurisdiction. Linux is a registered trademark of Linus Torvalds in the United States, other countries or both.)

In one embodiment, the selected system obtains the information and uses it to determine whether the selected system is able to dispatch workloads of the other system into, for instance, a container of the selected system. The container is, for instance, a docker container, such as a z/OS Docker container solution offered by International Business Machines Corporation. If, for instance, the information includes a selected tier indication (e.g., tier 3) of a purchased feature of the other system, such as an Ubuntu® Linux feature, it is determined that the workloads of the other system may be dispatched. Based on the selected system determining that workloads of the other system can be dispatched, the selected system dispatches the workloads of the other system into the container. (Ubuntu is a distribution of Linux, and is a registered trademark of Canonical Ltd.)

The docker container solution runs the workloads of the other operating system (e.g., Linux workloads), in one embodiment, within an existing logical partition hosting the selected operating system (e.g., z/OS logical partition), without assuming management responsibility for a new logical partition and the other operating system within it. Since the workload of the other operating system is not being run under the other operating system, the selected operating system (e.g., z/OS operating system) is to obtain the licensing tier level of the other operating system (e.g., the Ubuntu Linux licensing tier level) prior to executing the workload.

As one example, the presence of the license feature of the other operating system (e.g., the Linux license feature), and/or a number that reflects the purchased license tier, are stored in a first selected location, such as a record that includes information regarding the purchased/licensed and installed features. The purchased license tier level that was stored in the first selected location is then obtained (e.g., via a Store System Information instruction) and stored in a second selected location, such as a control block accessible to the selected operating system or host (e.g., a System Information Block (SYSIB)).

One embodiment of a computing environment to incorporate and use one or more aspects of the present invention is described with reference to FIG. 1. In one example, the computing environment is based on the z/Architecture® hardware architecture, offered by International Business Machines Corporation, Armonk, N.Y. One embodiment of the z/Architecture hardware architecture is described in "z/Architecture Principles of Operation," IBM Publication No. SA22-7832-11, September 2017, which is hereby incorporated herein by reference in its entirety. The z/Architecture hardware architecture is only one example architecture; the computing environment may be based on other architectures.

Figure 1:
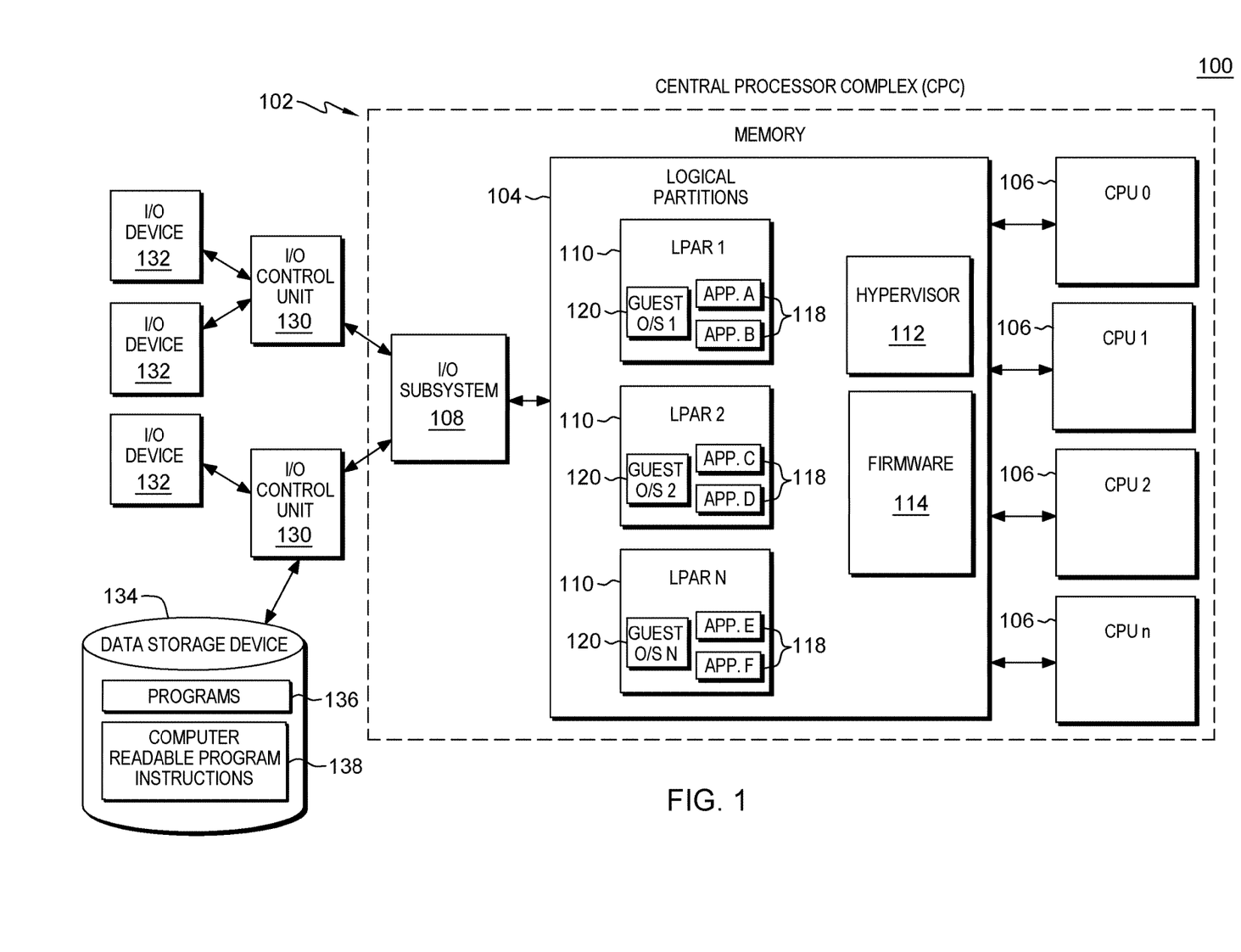
FIG. 1 depicts one example of a computing environment to incorporate and use one or more aspects of the present invention.

Referring to FIG. 1, in one example, a computing environment 100 includes a central processor complex (CPC) 102 providing logical partition support. Central processor complex 102 includes, for instance, a memory 104 (a.k.a., system memory, main memory, main storage, central storage, storage) coupled to one or more processors (a.k.a., central processing units (CPUs)) 106 and to an input/output subsystem 108, each of which is described below.

Memory 104 includes, for example, one or more logical partitions 110, a logical partition manager, such as a hypervisor 112, and firmware 114. One example of hypervisor 112 is PR/SM™ (Processor Resource/System Manager), offered by International Business Machines Corporation, Armonk, N.Y. The hypervisor is sometimes referred to as a host. (z/Architecture and PR/SM are trademarks or registered trademarks of International Business Machines Corporation in at least one jurisdiction.)

Firmware 114 includes, e.g., the microcode of the processor and/or of the system. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

The logical partition support of the CPC provides the ability to operate large numbers of logical partitions 110, each capable of operating with different programs 118 and running an operating system 120, such as the z/OS operating system, or another operating system. Each logical partition 110 is capable of functioning as a separate system. That is, each logical partition can be independently reset, run an operating system, and operate with different programs. An operating system or application program running in a logical partition appears to have access to a full and complete system, but in reality, only a portion of it is available.

Memory 104 is coupled to processors (e.g., CPUs) 106, which are physical processor resources assignable to the logical partitions. For instance, logical partition 110 includes one or more logical processors, each of which represents all or a share of a physical processor resource 106 that may be dynamically allocated to the logical partition.

Further, memory 104 is coupled to an input/output (I/O) subsystem 108. Input/output subsystem 108 directs the flow of information between input/output control units 130 and I/O devices 132, including data storage device(s) 134, and main storage 104. It is coupled to the central processing complex, in that it can be a part of the central processing complex or separate therefrom.

Data storage device 134 may store one or more programs 136, one or more computer readable program instructions 138, and/or data, etc. The computer readable program instructions may be configured to carry out functions of embodiments of aspects of the invention.

Central processor complex 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode, device drivers, redundant processing units, external disk drive arrays, RAID systems, tape drives, and data archival storage systems, etc.

Central processor complex 102 may be operational with numerous other general-purpose or special-purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Further, central processor complex 102 is able to communicate with one or more networks, such as a local area network (LAN), a general wide area network (WAN), and/or a public network (e.g., the Internet), providing communication with other computing devices or systems via one or more interfaces, devices and/or other connections.

In accordance with one or more aspects of the present invention, a selected operating system (e.g., a z/OS operating system; referred to herein as a non-Linux operating system for convenience) is provided an ability to obtain information about another operating system (e.g., a Linux operating system). For instance, the operating system that is currently running on a machine model, such as the non-Linux operating system, obtains information regarding software features purchased by a client (e.g., the entity that obtained the license or entitlement) that relate to, e.g., the Linux operating system.

As an example, the presence of a license feature (e.g., a Linux license feature) and/or a number that reflects the purchased license tier (e.g., a Linux license tier) are stored in a selected location, such as a record that includes such information. Thereafter, the license tier level that is stored in the selected location is obtained and stored in another selected location, such as a control block. In one particular example, the control block is a System Information Block (e.g., SYSIB 1.1.1) that includes machine configuration information; however, other control blocks accessible to a host (e.g., the selected operating system) may be used.

Figure 2:
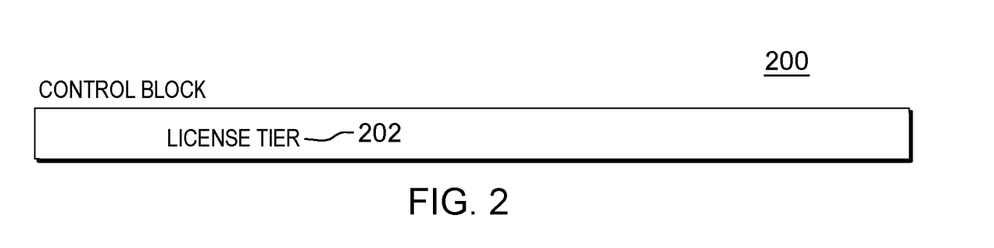
FIG. 2 depicts one example of a control block used in accordance with an aspect of the present invention.

One example of a control block is described with reference to FIG. 2. As an example, a control block 200 is stored in memory or in another location, and includes at least one field, such as, for instance:

License Tier 202: When nonzero, this field includes, in accordance with an aspect of the present invention, e.g., a 16-bit unsigned integer whose value is in, e.g., the range 0-3 and represents the tier of an embedded license entitled on the system. In one particular example, the license tier is a Linux license tier (LLT), and the following tier levels are currently available, as an example: LLT-0 represents no license purchased (no embedded operating system (OS)); LLT-1 represents only the embedded OS base (no application); LLT-2 represents only single embedded OS application; and LLT-3 represents multiple embedded OS applications. In other embodiments, other license tiers may be represented by this field and/or other fields of the control block.

In other embodiments, the control block may include additional and/or other fields. Further, although example sizes of fields, values of the fields, etc., are provided, these are only examples. Other sizes, values etc. may be used. Many variations are possible.

In one embodiment, the license tier (e.g., the Linux License Tier) is obtained from one selected location (e.g., a record) and stored in another selected location (e.g., the control block) using an instruction, such as a Store System Information instruction, an example of which is described with reference to FIGS. 3A-3C. In other embodiments, other instructions and/or mechanisms may be used.

Figure 3A:
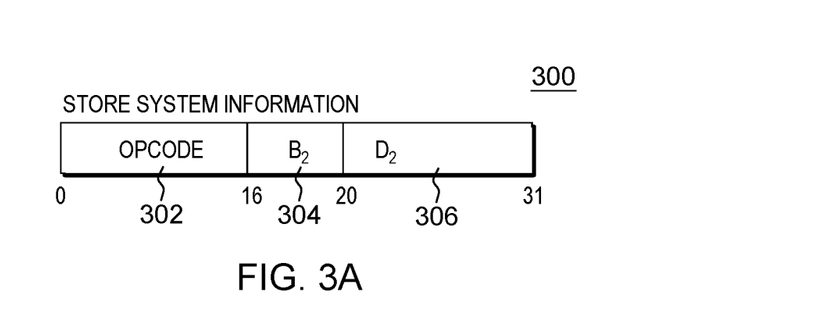
FIG. 3A depicts one example of a Store System Information instruction used in accordance with an aspect of the present invention.

Referring to FIG. 3A, in one embodiment, a Store System Information instruction 300 is, e.g., a single architected hardware machine instruction at the hardware/software interface. It includes, for instance, an operation code field (opcode) 302 including an operation code specifying a store system information operation; and a base field ($B_2$) 304 and a displacement field ($D_2$) 306 used to provide a second operand address. For instance, the contents of a register specified by base field 304 are added to the contents of displacement field 306 to provide the second operand address used by the instruction, as indicated below. In other embodiments, other fields may be used.

In one embodiment, Store System Information instruction 300 uses two implied registers (implied since they are not explicitly referred to in the instruction) referred to as general register 0 and general register 1, examples of which are described below. In other embodiments, the registers may be explicitly specified and/or other registers and/or locations may be used.

Figure 3B:
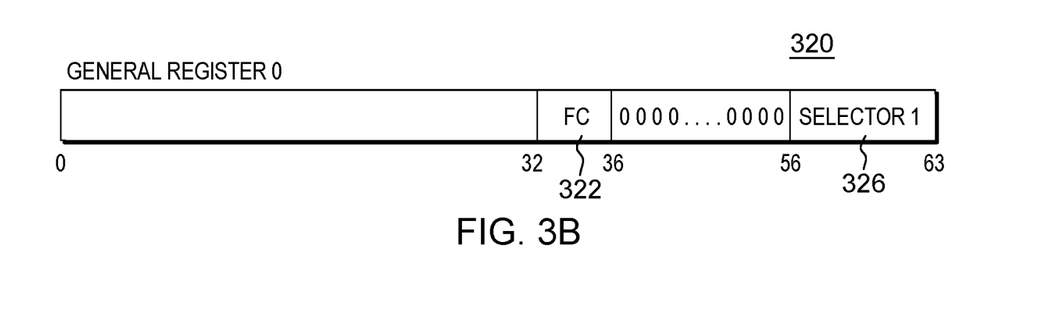
FIGS. 3B-3C depict examples of general registers used by the Store System Information instruction of FIG. 3A, in accordance with an aspect of the present invention.

Referring to FIG. 3B, in one example, general register 0 (320) includes, for instance, a function code field 322 which includes a function code used by the instruction, and a selector 1 field 326 which includes a value for selector 1 used as described below.

Example function codes include, for instance:

| Function Code | Information Requested |
| --- | --- |
| 0 | Current-configuration-level number |
| 1 | Information about level 1 (the basic machine) |
| 2 | Information about level 2 (a logical partition) |
| 3 | Information about level 3 (a virtual machine) |
| 4-14 | None; codes are reserved |
| 15 | Current-configuration-level information |

Figure 3C:
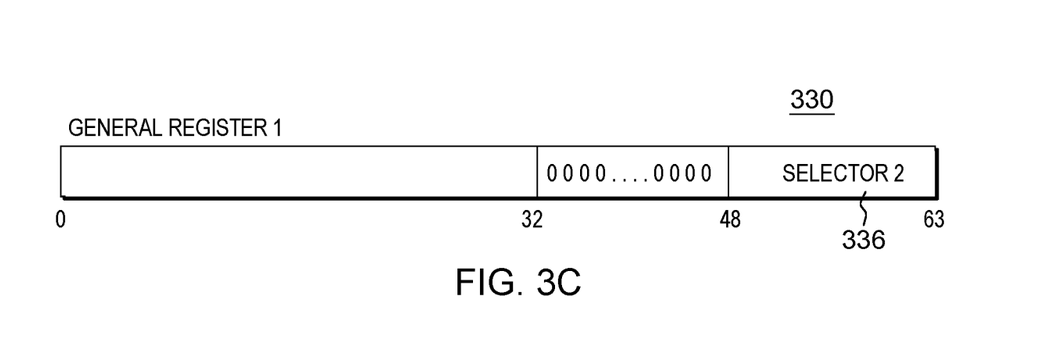

Referring to FIG. 3C, in one example, general register 1 (330) includes, for instance, a selector 2 field 336 which includes a value for selector 2 used as described below.

When the function code is valid and nonzero, information may be stored in a control block (e.g., control block 200, such as a SYSIB) beginning at the second operand location (e.g., determined using $B_2$ and $D_2$). The control block is, e.g., 4K bytes and is to begin at a 4 K-byte boundary; otherwise, a specification exception may be recognized, depending on selector 1 and selector 2 and on whether access exceptions are recognized.

In one example, selector 1 (326) can have values as follows:

| Selector 1 | Information Requested |
| --- | --- |
| 0 | None; selector is reserved |
| 1 | Information about the configuration level specified by the function code |
| 2 | Information about one or more CPUs in the specified configuration level |
| 3-255 | None; selectors are reserved |

When selector 1 is set, e.g., to 1, selector 2 can have values as follows, in one example:

| Selector 2 | Information Requested |
| --- | --- |
| 0 | None; selector is reserved |
| 1 | Information about the specified configuration level |
| 2-6 | Topology information about the specified configuration level |
| 7-65,535 | None; selectors are reserved |

When selector 1 is, e.g., 2, selector 2 can have values as follows, in one example:

| Selector 2 | Information Requested |
| --- | --- |
| 0 | None; selector is reserved |
| 1 | Information about the CPU executing the program in the specified configuration level |
| 2 | Information about all CPUs in the specified configuration level |
| 3-65,535 | None; selectors are reserved |

Only certain combinations of the function code, selector 1, and selector 2 are valid, as shown below, in one or more examples:

| Function Code | Selector 1 | Selector 2 | Information Requested about |
| --- | --- | --- | --- |
| 0 | Ignored | Ignored | Current-configuration-level number |
| 1 | 1 | 1 | Basic-machine configuration |
| 1 | 2 | 1 | Basic-machine CPU |

-continued

| Function Code | Selector 1 | Selector 2 | Information Requested about |
|---|---|---|---|
| 1 | 2 | 2 | Basic-machine CPUs |
| 2 | 2 | 1 | Logical-partition CPU |
| 2 | 2 | 2 | Logical-partition CPUs |
| 3 | 2 | 2 | Virtual-machine CPUs |
| 15 | 1 | 2-6 | Topology information of current configuration |

When the specified function code, selector 1, and selector 2 combination is invalid (e.g., is other than as shown above), or if it is valid but the requested information is not available because the specified level does not implement or does not fully implement the instruction or because a selected part of the level is uninstalled or not initialized, and provided that an exception is not recognized, the condition code is set to, e.g., 3. When the function code is nonzero, the combination is valid, the requested information is available, and there is no exception, the requested information is stored in a control block at the second operand address.

In operation of the Store System Information instruction, in one example, depending on the function code in general register 0, either an identification of the level of the configuration executing the program is placed in general register 0 or information about a component or components of a configuration is stored in a control block, such as control block 200. When information about a component or components is requested, the information is specified by further contents of general register 0 and by contents of general register 1. The control block, if any, is designated by the second operand address.

The machine is considered to provide one, two, or three levels of configuration, as an example. The levels are, for instance:
1. The basic machine, which is the machine as if it were operating in the basic mode.
2. A logical partition, which is provided if the machine is operating in the logically partitioned (LPAR) mode. A logical partition is provided by the LPAR hypervisor, which is a part of the machine. Basic-machine configuration information is provided even when the machine is operating in the LPAR mode.
3. A virtual machine, which is provided by a virtual machine (VM) control program that is executed either by the basic machine or in a logical partition. A virtual machine may itself execute a VM control program that provides a higher-level (more removed from the basic machine) virtual machine, which also is considered a level-3 configuration.

The terms basic mode, LPAR mode, logical partition, hypervisor, and virtual machine, and any other terms related specifically to those terms, are defined in the machine manuals.

A program being executed by a level-1 configuration (the basic machine) can request information about that configuration. A program being executed by a level-2 configuration (in a logical partition) can request information about the logical partition and about the underlying basic machine. A program being executed by a level-3 configuration (a virtual machine) can request information about the virtual machine and about the one or two underlying levels; a basic machine is underlying, and a logical partition may or may not be between the basic machine and the virtual machine. When information about a virtual machine is requested, information is provided about the configuration executing the program and about any underlying level or levels of the virtual machine.

The function code determining the operation is, e.g., an unsigned binary integer in, e.g., bit positions 32-35 of general register 0. Example function codes are provided above.

The level of the configuration executing the program is called the current level. The configuration level specified by a nonzero function code (other than, e.g., 15) is called the specified level. When the specified level is numbered higher than the current level, then the function code is called invalid, the condition code is set to, e.g., 3, and no other action (including checking) is performed. Function code 15 is invalid when the configuration-topology facility is not installed.

When the function code is equal to or less than the number of the current level, or, e.g., 15, it is called valid. In this case, in one example, bits 36-55 of general register 0 and bits 32-47 of general register 1 are to be zero; otherwise, a specification exception is recognized. Bits 0-31 of general registers 0 and 1 are ignored, in one example.

When the function code is 0, an unsigned binary integer identifying the current configuration level (1 for basic machine, 2 for logical partition, or 3 for virtual machine) is placed in bit positions 32-35 of general register 0, the condition code is set to, e.g., 0, and no further action is performed.

When the function code is valid and nonzero, general registers 0 and 1 contain additional specifications about the information requested, as follows, in one example:
Bit positions 56-63 of general register 0 contain an unsigned binary integer, called selector 1, that specifies a component or components of the specified configuration.
Bit positions 48-63 of general register 1 contain an unsigned binary integer, called selector 2, that specifies the type of information requested.

As described herein, the Store System Information instruction is issued by an operating system to obtain information regarding another operating system. In one example, the information is the license tier information, and the function code, selector 1 and selector 2 are set to, e.g., one. Other variations are also possible.

Further details regarding obtaining information by a selected system (e.g., a non-Linux operating system, such as a z/OS operating system), relating to software products licensed by another operating system, such as a Linux operating system, are described with reference to FIGS. 4A-4B.

Figure 4A:
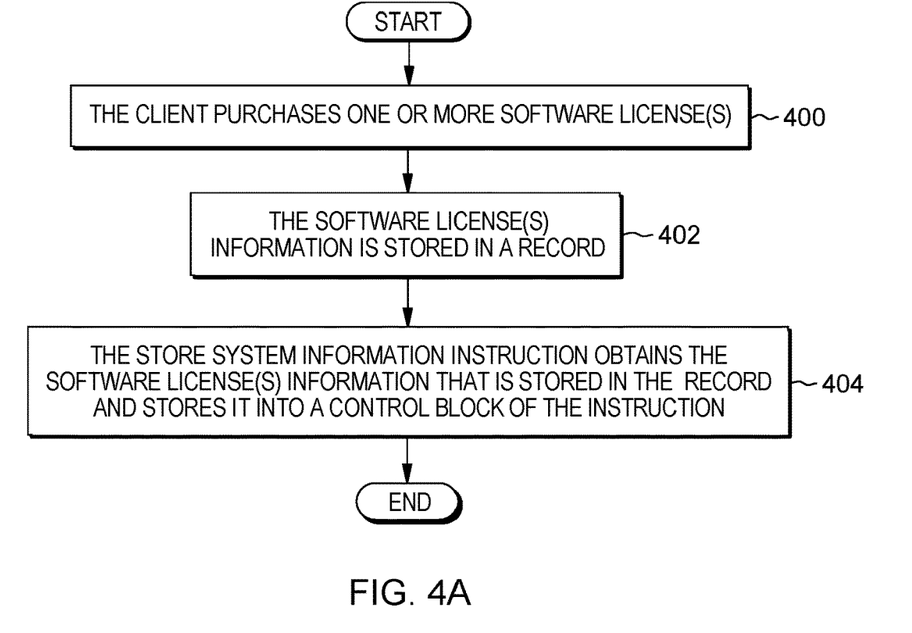
FIG. 4A depicts one example of a process of obtaining information by a selected system regarding software features of another system, in accordance with an aspect of the present invention.
Figure 4B:
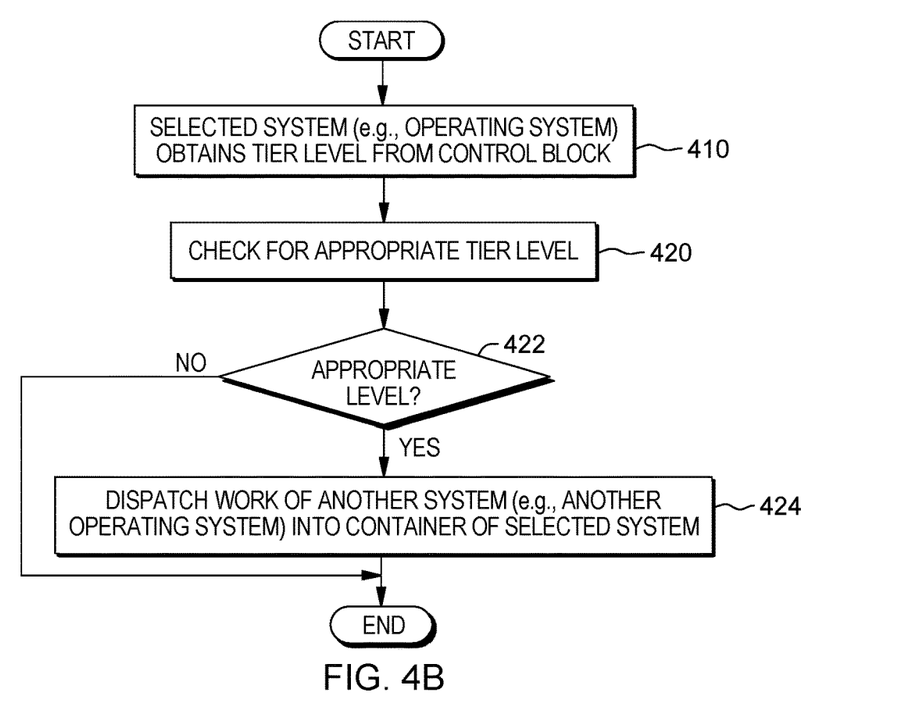
FIG. 4B depicts one example of using the obtained information to determine whether workloads of the other system can be executed by the selected system, in accordance with an aspect of the present invention.

Referring to FIG. 4A, in one embodiment, a client purchases one or more software licenses, STEP 400. Information regarding the software licenses is stored in a selected location, such as a record (e.g., in memory) or other selected location, STEP 402. The information stored in the selected location is obtained using, for instance, the Store System Information instruction, and stored in another selected location, such as a control block response block of the Store System Information instruction, STEP 404. In one example, the Store System Information instruction is issued by a selected operating system (e.g., the z/OS operating system) after an initial program load of, e.g., the z/OS operating system is complete.

Based on obtaining the information, the information is used to determine whether workloads of an operating system different from the selected operating system may be dispatched by the selected operating system. One example of this processing is described with reference to FIG. 4B. Referring to FIG. 4B, a system, such as a currently executing z/OS operating system, obtains information from the control block, such as a license tier level of, e.g., the Linux operating system, STEP 410. The system checks, e.g., the license tier level, STEP 420. For instance, the currently executing operating system (e.g., the z/OS operating system) checks whether the license tier level stored in the control block is, for instance, a Linux tier licensing feature at tier 3 (other tier levels and/or licensing features may be checked, in other embodiments). If the tier level is at the appropriate level, INQUIRY 422, then the currently executing operating system dispatches work of the other system (e.g., Linux operating system), STEP 424. In one example, the work is dispatched into one or more instances of the z/OS Docker container.

Thus, in accordance with an aspect of the present invention, the z/OS Docker container (or another docker container or other component) is able to run Linux (or other) workloads within an existing z/OS (or other) logical partition, absent assuming management responsibility for a new logical partition and the Linux (or other) operating system within it.

As described herein, in one or more aspects, a mechanism is provided for one operating system (e.g., the z/OS operating system or other operating system) to obtain information relating to one or more other operating systems (e.g., Linux operating systems or other operating systems) and their software feature(s) purchased by a client. The mechanism includes, for instance, using an architected instruction, such as the Store System Information instruction, and a selected record to provide the information to the selected operating system. Other variations and embodiments are possible.

One or more aspects of the present invention are inextricably tied to computer technology and facilitate processing within a computer, improving performance thereof. In one or more aspects, one system may run workloads of another system without assuming responsibility for another logical partition or of another operating system. This provides flexibility in processing.

Figure 5A:
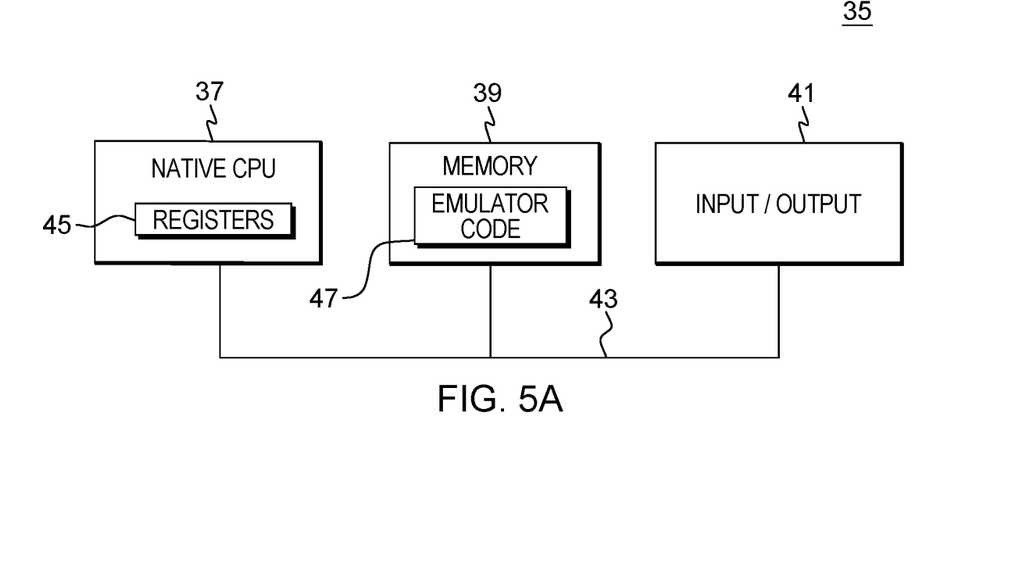
FIG. 5A depicts another example of a computing environment to incorporate and use one or more aspects of the present invention.

Other types of computing environments may also incorporate and use one or more aspects of the present invention, including, but not limited to, emulation environments, an example of which is described with reference to FIG. 5A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC® processor offered by International Business Machines Corporation, Armonk, N.Y.; and/or other machines based on architectures offered by International Business Machines Corporation, Intel Corporation, or other companies. PowerPC is a trademark or registered trademark of International Business Machines Corporation in at least one jurisdiction. Intel is a trademark or registered trademark of Intel Corporation or its subsidiaries in the United States and other countries.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture hardware architecture, such as PowerPC processors, or other servers or processors, to emulate the z/Architecture hardware architecture and to execute software and instructions developed based on the z/Architecture hardware architecture.

Figure 5B:
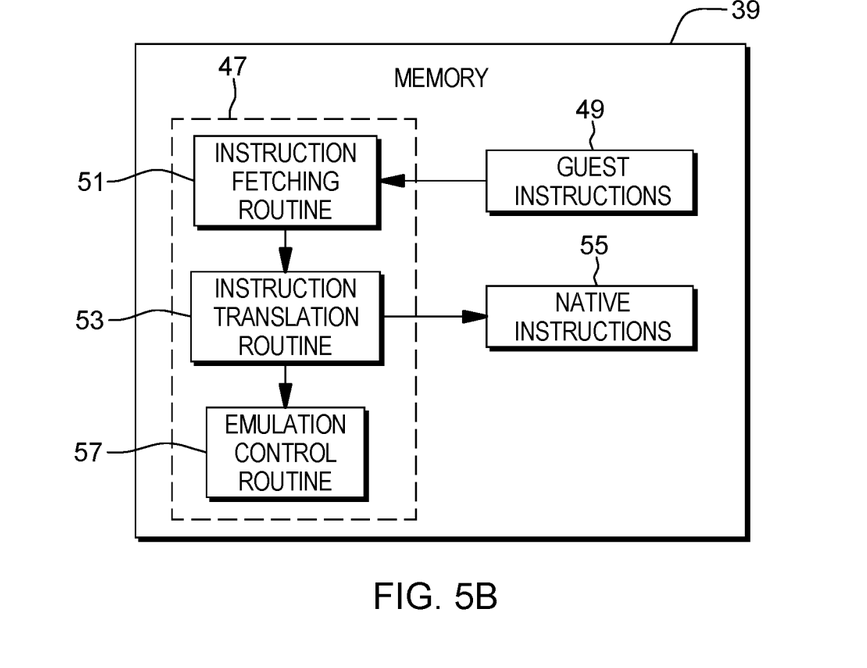
FIG. 5B depicts further details of the memory of FIG. 5A.

Further details relating to emulator code 47 are described with reference to FIG. 5B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture hardware architecture processor, but instead, are being emulated on native CPU 37, which may be, for example, a PowerPC or other processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
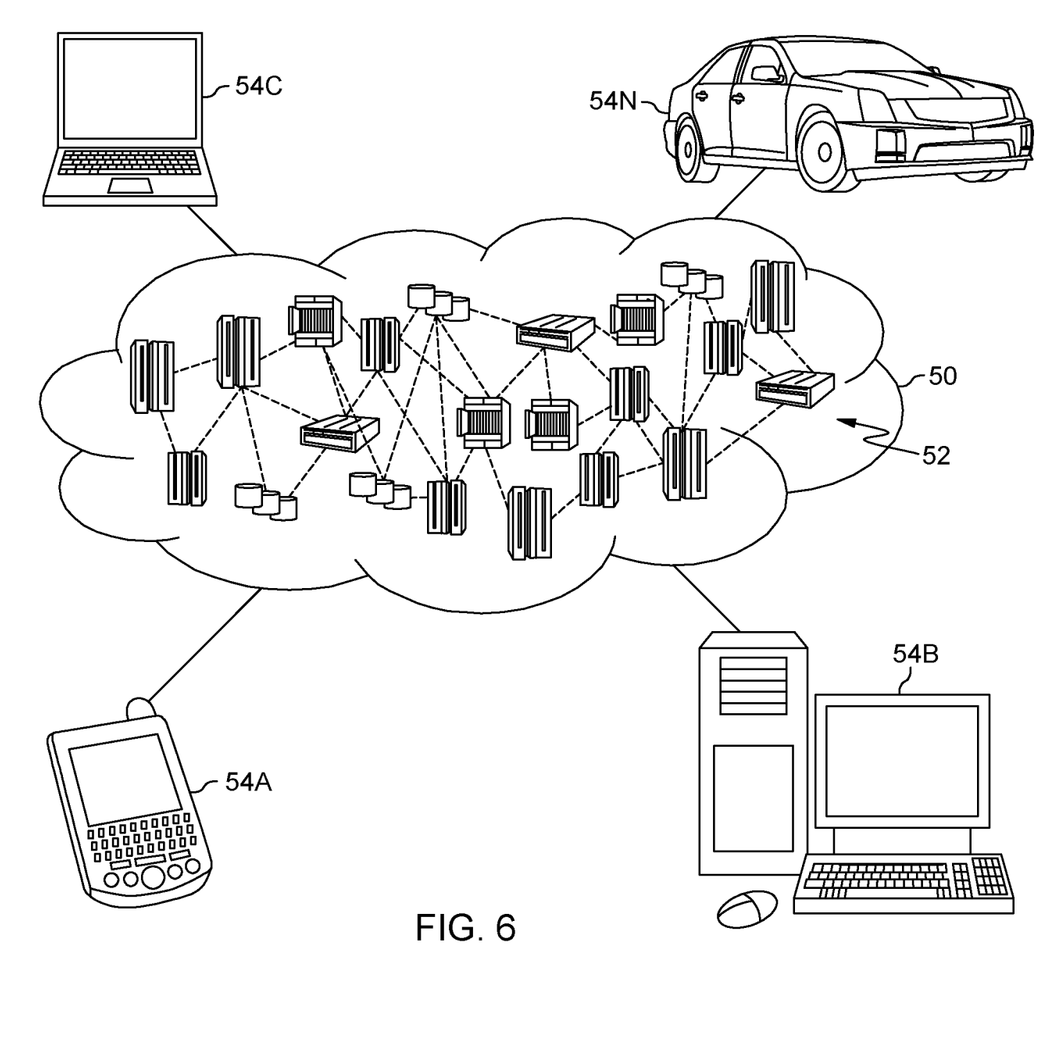
FIG. 6 depicts one embodiment of a cloud computing environment.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
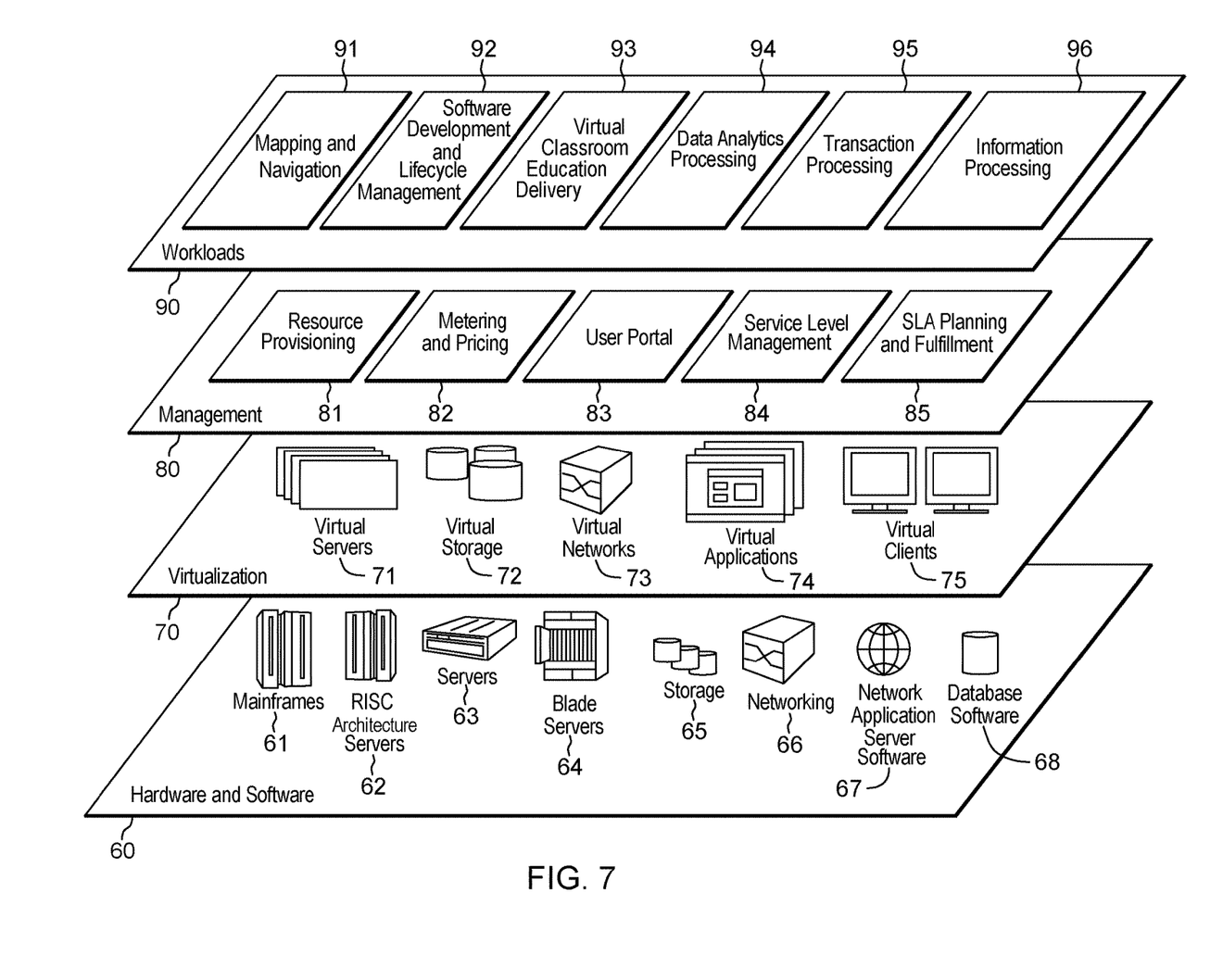
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and information processing of one or more aspects of the present invention 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different operating systems may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
at least one computer readable storage medium readable by at least one processing circuit and storing instructions for performing a method, the method comprising:
obtaining, by a first operating system, a license tier level of a second operating system;
determining whether the license tier level is at a selected license tier level; and
dispatching, by the first operating system, a workload of the second operating system into a container of the first operating system, based on determining that the license tier level is at the selected license tier level, in which the workload is included in the container and is to be run by the container of the first operating system.

2. The computer program product of claim 1, wherein the obtaining the license tier level of the second operating system comprises obtaining the license tier level from a control block.

3. The computer program product of claim 2, wherein the method further comprises:
obtaining the license tier level from a location in memory; and storing the license tier level obtained from the location in memory in the control block.

4. The computer program product of claim 3, wherein the location in memory comprises a record that includes information regarding licensed software features.

5. The computer program product of claim 3, wherein the storing the license tier level comprises storing the license tier level of the second operating system in a license tier field of the control block.

6. The computer program product of claim 5, wherein the determining whether the license tier level is at the selected license tier level comprises:
checking the license tier field of the control block for a value of the license tier level to determine whether the value of the license tier level is equal to the selected license tier level.

7. The computer program product of claim 6, wherein the selected license tier level indicates a license for a plurality of embedded operating system applications.

8. The computer program product of claim 3, wherein the method further comprises executing a store system information instruction, the store system information instruction obtaining the license tier level from the location in memory and storing the license tier level in the control block.

9. The computer program product of claim 1, wherein the container of the first operating system runs the workload of the second operating system within an existing logical partition hosting the first operating system.

10. The computer program product of claim 1, wherein the first operating system comprises one type of operating system, and the second operating system comprises another type of operating system different from the first type of operating system.

11. A computer system for facilitating processing within a computing environment, the computer system comprising:
a memory; and
a processor in communication with the memory, wherein the computer system is configured to perform a method, said method comprising:
obtaining, by a first operating system, a license tier level of a second operating system;
determining whether the license tier level is at a elected license tier level; and
dispatching, by the first operating system, a workload of the second operating system into a container of the first operating system, based on determining that the license tier level is at the selected license tier level, in which the workload is included in the container and is to be run by the container of the first operating system.

12. The computer system of claim 11, wherein the obtaining the license tier level of the second operating system comprises obtaining the license tier level from a control block.

13. The computer system of claim 12, wherein the method further comprises:
obtaining the license tier level from a location in memory; and
storing the license tier level obtained from the location in memory in the control block.

14. The computer system of claim 13, wherein the storing the license tier level comprises storing the license tier level of the second operating system in a license tier field of the control block.

15. The computer system of claim 14, wherein the determining whether the license tier level is at the selected license tier level comprises:
checking the license tier field of the control block for a value of the license tier level to determine whether the value of the license tier level is equal to the selected license tier level.

16. A computer-implemented method of facilitating processing within a computing environment, the computer-implemented method comprising:
obtaining, by a first operating system, a license tier level of a second operating system;
determining whether the license tier level is at a selected license tier level; and
dispatching, by the first operating system, a workload of the second operating system into a container of the first operating system, based on determining that the license tier level is at the selected license tier level, in which the workload is included in the container and is to be run by the container of the first operating system.

17. The computer-implemented method of claim 16, wherein the obtaining the license tier level of the second operating system comprises obtaining the license tier level from a control block.

18. The computer-implemented method of claim 17, further comprising:
obtaining the license tier level from a location in memory; and
storing the license tier level obtained from the location in memory in the control block.

19. The computer-implemented method of claim 18, wherein the storing the license tier level comprises storing the license tier level of the second operating system in a license tier field of the control block.

20. The computer-implemented method of claim 19, wherein the determining whether the license tier level is at the selected license tier level comprises:
checking the license tier field of the control block for a value of the license tier level to determine whether the value of the license tier level is equal to the selected license tier level.

* * * * *